March 29, 1927.
G. A. EDWARDS
1,622,943
ELEVATOR SUPPORT
Original Filed June 13, 1924
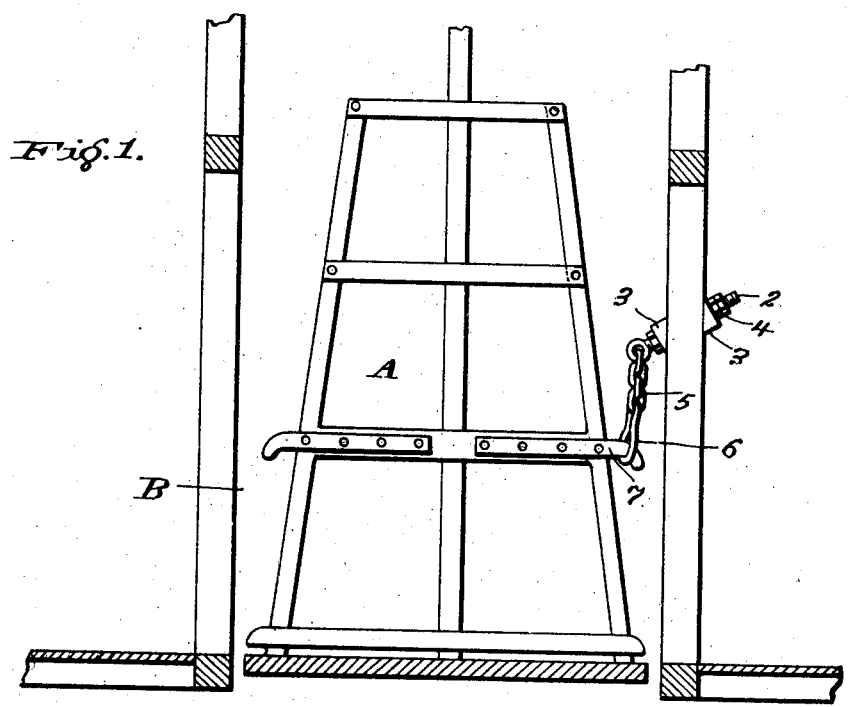
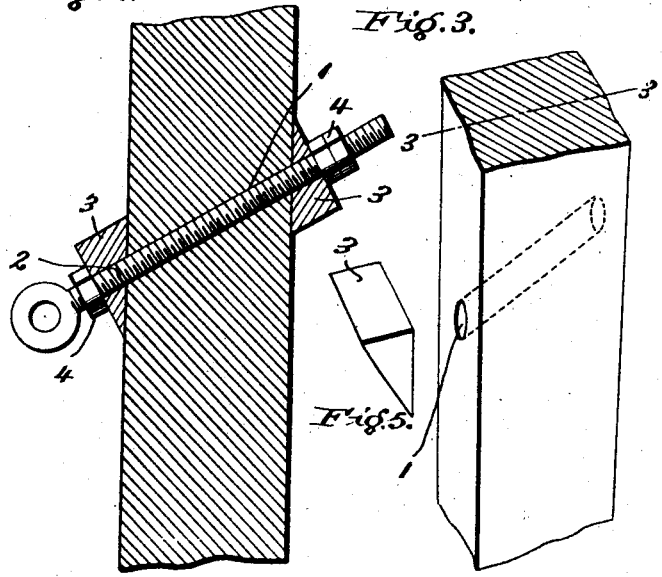
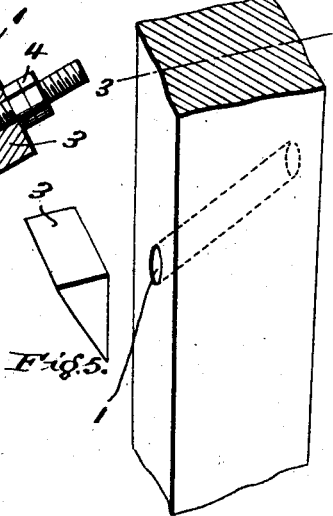
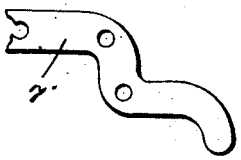
George A. Edwards,
INVENTOR
BY Victor J. Evans
ATTORNEY
WITNESS: Gerald Hennessy Patented Mar. 29, 1927.

1,622,943

UNITED STATES PATENT OFFICE.

GEORGE A. EDWARDS, OF BISBEE, ARIZONA, ASSIGNOR OF ONE-HALF TO FRED HENDERSON, OF BISBEE, ARIZONA, AND ONE-HALF TO NELLIE V. EDWARDS.

ELEVATOR SUPPORT.

Application filed June 13, 1924, Serial No. 719,863. Renewed January 28, 1927.

This invention relates to an attachment for a cage or elevator, the general object of the invention being to provide means for holding the cage at a floor level while it is being loaded or unloaded.

Another object of the invention is to so form the holding means that the cage will be automatically released as it starts its upward movement.

This invention also consists in certain other features of construction and in the combination and arrangement of the several parts, to be hereinafter fully described, illustrated in the accompanying drawings and specifically pointed out in the appended claims.

In describing my invention in detail, reference will be had to the accompanying drawings wherein like characters denote like or corresponding parts throughout the several views, and in which:—

Figure 1 is a sectional view showing how the invention is used.

Figure 2 is a sectional view through one of the posts and showing how the holding bolt is arranged in said post.

Figure 3 is a view of the post with the hole therein for the bolt.

Figure 4 is a view of a modified form of hook.

Figure 5 is a view of one of the wedge members.

In these views, A indicates the cage or elevator and B the shaft in which the elevator moves. In carrying out my invention I form an inclined hole 1 in one of the timbers of the shaft and place therein the threaded shank of an eye bolt 2. The wedge plates 3 are placed on opposite faces of the post and the bolt passes through these plates. These plates form bearing surfaces for the nuts 4 which hold the bolt in place and which provide means for permitting the bolt to be adjusted in the post. A chain 5 has its upper link engaging the eye of the bolt and the lower link 6 of said chain is enlarged to engage a hook member 7 which is bolted to the cage. Figure 4 shows a different type of hook member at 7' which is used on standard cages, the hook shown in Figure 1 being used on small cages.

From the foregoing it will be seen that when the cage reaches a floor level it is simply necessary to swing the chain outwardly and place the link 6 in engagement with the hook 7. This will hold the cage at the floor level so that is can be unloaded or loaded without danger of movement of the cage. When the cage starts upward the link 6 will automatically drop from the hook so that it is not necessary to remove the link from the hook.

By placing the bolt on an incline in the post the device has greater strength and there is less tendency for the bolt to break on a hard pull. The wedge plates act as washers as well as bearing surfaces for the nuts. By making the link 6 of considerable length it can be placed in engagement with the hook without danger of the operator getting his hand pinched. The nuts also permit the bolt to be lengthened or shortened to adjust the chain so that the cage can be held on a level with the floor. By having a hook on each side of the cage the cage can be held at different stations, the chain at one station being arranged at one side of the shaft and the chain at the other station being arranged on the opposite side. This device takes the load off the cable and holds the cage level with the floor and when it is not in use the chain hangs down alongside of the shaft entirely out of the way of the cage.

It is thought from the foregoing description that the advantages and novel features of my invention will be readily apparent.

I desire it to be understood that I may make changes in the construction and in the combination and arrangement of the several parts, provided that such changes fall within the scope of the appended claims.

What I claim is:—

1. In combination with a cage and its shaft, a bolt inclinedly arranged in one of the timbers of the shaft, wedge-shaped plates at opposite sides of the timber through which the bolt passes, nuts on the bolt engaging the plates, said bolt having an eye at its lower inner end, a chain having its upper link engaging the eye and its lower link enlarged and a hook on the cage for engaging the enlarged link.

2. An elevator support including in combination with a support having an inclined opening therethrough, of a bolt in said opening, wedge-shaped plates mounted upon each end of the bolt and having their tapered portions extending in opposite directions upon opposite sides of the support, nuts on the bolts engaging the plates, said bolt having an eye at its lowermost end, a chain having its upper link engaging the eye and its lower link enlarged as and for the purpose specified.

In testimony whereof I affix my signature.

GEORGE A. EDWARDS.